United States Patent [19]

MacDonald et al.

[11] Patent Number: 5,537,416
[45] Date of Patent: Jul. 16, 1996

[54] BUFFER ALLOCATION TO REPEATED INFORMATION BLOCKS IN DATA TRANSMISSION, PARTICULARLY VIDEO TRANSMISSION

[75] Inventors: Neil E. MacDonald; Andrew P. Heron, both of Ipswich; Stephen R. Gunby, Essex, all of England

[73] Assignee: British Telecommunications public limited company, London, England

[21] Appl. No.: 307,625

[22] PCT Filed: Mar. 29, 1993

[86] PCT No.: PCT/GB93/00644

§ 371 Date: Sep. 20, 1994

§ 102(e) Date: Sep. 20, 1994

[87] PCT Pub. No.: WO93/20632

PCT Pub. Date: Oct. 14, 1993

[30] Foreign Application Priority Data

Mar. 27, 1992 [GB] United Kingdom .................... 9206863

[51] Int. Cl.[6] ................................................... G06F 11/10
[52] U.S. Cl. ................................................. 371/32; 371/35
[58] Field of Search ................................ 371/32, 33, 31, 371/35, 37.1; 385/85, 133, 134

[56] References Cited

U.S. PATENT DOCUMENTS 4,774,587  9/1988  Schmitt .
4,887,162  12/1989  Arai .
5,036,518  7/1991  Tseung ........................................ 371/32
5,109,384  4/1992  Tseung ........................................ 371/32

FOREIGN PATENT DOCUMENTS 0214020  3/1987  European Pat. Off. .
0415502A2  3/1991  European Pat. Off. .

OTHER PUBLICATIONS

Carr, "New Video Coding Standard for the 1990s", Electronics and Communication Engineering Journal, vol. 2, No. 3, 1990, London GB, pp. 119–124.

Primary Examiner—Roy N. Envall, Jr.
Assistant Examiner—Thomas E. Brown
Attorney, Agent, or Firm—Nixon & Vanderhye

[57] ABSTRACT

Apparatus for transmitting and receiving information blocks, particularly video information, is arranged so that on receiving a corrupted information block it stores a first receiver buffer address at which the data block should be stored if subsequently successfully repeated in a later information block. The apparatus keeps track of the time taken to receive a requested repeat information block and on receiving the later information block at the predicted time, and on determining that it is uncorrupted, stores the data in the receiver buffer at the stored buffer address. Such apparatus can allocate received, repeated and non-repeated data blocks to their correct relative positions within the receiver buffer without the need for numbering of the data blocks on transmission giving a consequential reduction in the size of the data blocks being transmitted.

38 Claims, 14 Drawing Sheets

Fig.3.

| TSB | TFNB | RF | SF | RSB | RFNB | Curr.ACK | Prev.ACK1 | Prev.ACK2 | DATA | CHK |
|---|---|---|---|---|---|---|---|---|---|---|

Fig.4.

| TSB7 | TFNB7 | RF | SF | RSBx | RFNBx | Curr.ACK | Prev.ACK1 | Prev.ACK2 | DATA | CHK |
|---|---|---|---|---|---|---|---|---|---|---|
| TSB6 | TFNB6 | RF | SF | RSBx | RFNBx | Curr.ACK | Prev.ACK1 | Prev.ACK2 | DATA | CHK |
| TSB5 | TFNB5 | RF | SF | RSBx | RFNBx | Curr.ACK | Prev.ACK1 | Prev.ACK2 | DATA | CHK |
| TSB4 | TFNB4 | RF | SF | RSBx | RFNBx | Curr.ACK | Prev.ACK1 | Prev.ACK2 | DATA | CHK |
| TSB3 | TFNB3 | RF | SF | RSBx | RFNBx | Curr.ACK | Prev.ACK1 | Prev.ACK2 | DATA | CHK |
| TSB2 | TFNB2 | RF | SF | RSBx | RFNBx | Curr.ACK | Prev.ACK1 | Prev.ACK2 | DATA | CHK |
| TSB1 | TFNB1 | RF | SF | RSBx | RFNBx | Curr.ACK | Prev.ACK1 | Prev.ACK2 | DATA | CHK |
| TSB0 | TFNB0 | RF | SF | RSBx | RFNBx | Curr.ACK | Prev.ACK1 | Prev.ACK2 | DATA | CHK |

Fig.6.

| Receiver Input | | ACK Outputs | | |
|---|---|---|---|---|
| Block Number | Block type | Curr. ACK | Prev. ACK1 | Prev. ACK2 |
| 0 | Non-corrupt | 1 | 1 | 1 |
| 1 | Non-corrupt | 1 | 1 | 1 |
| 2 | Corrupt | 0 | 1 | 1 |
| 3 | Non-corrupt | 1 | 0 | 1 |
| 4 | Non-corrupt | 1 | 1 | 0 |
| 5 | Non-corrupt | 1 | 1 | 1 |
| 6 | Corrupt | 0 | 1 | 1 |
| 7 | Corrupt | 0 | 0 | 1 |
| 8 | Non-corrupt | 1 | 0 | 0 |
| 9 | Corrupt | 0 | 1 | 0 |
| 10 | Non-corrupt | 1 | 0 | 1 |
| 11 | Non-corrupt | 1 | 1 | 0 |
| n... | | | | |

BUFFER ALLOCATION TO REPEATED INFORMATION BLOCKS IN DATA TRANSMISSION, PARTICULARLY VIDEO TRANSMISSION

BACKGROUND OF THE INVENTION

1. Field of the Invention

This invention relates to apparatus for receiving information blocks, each of which includes a data block, from a further apparatus in a duplex communications system and in particular to such apparatus which is arranged to determine if a received information block has been corrupted by transmission and when it has, to request the further apparatus to repeat the transmission of the data block of that information block, the data blocks being stored in a receiver buffer.

2. Related Art

When exchanging information over a noisy channel information blocks can be corrupted so it becomes necessary to implement an Automatic Repeat request (ARQ) scheme if the lost data blocks are to be obtained. Of the known conventional ARQ schemes of stop-and-wait, go-back-N and selective repeat (SR), the last is the most efficient in terms of throughput as only those data blocks in corrupted information blocks are retransmitted. It is especially attractive to use such an SR scheme in communications systems with the noisiest channels, for example those using radio links, where many repeats may be needed.

The repeated data blocks when received in a later transmitted information block will generally need to be placed in a particular position relative to the data blocks already received. This is achieved in prior art systems by including as part of each data block a data block number which the apparatus can use to identify the data block and so position it appropriately.

SUMMARY OF THE INVENTION

According to the present invention, apparatus is arranged, on receiving a corrupted information block, to a) store a first receiver buffer address being the address at which the data block of the corrupted information block is to be stored if repeated in a later information block b) determine in which later information block the repeat transmission of the data block is expected to occur; and c) store the data block in the receiver buffer at the first receiver buffer address on receiving the later information block uncorrupted.

On receiving a corrupted information block, the apparatus stores nine address where the data block should have been stored if not corrupted. When the later information block containing the repeated data block is received by the apparatus, the data is (if not again corrupted) stored in the appropriate place in the buffer. Because the apparatus previously determined that this information block would contain the required repeated data block it can, when it arrives, store the data block at the required place in the buffer given by the stored first receiver buffer address. This can be without reference to any data block number which is now unnecessary and so can be omitted.

The present invention can therefore allocate received, repeated and non-repeated data blocks to their correct relative positions within the receiver buffer without the need for numbering of the data blocks and with a consequential reduction in the size of the data blocks being transmitted.

If the later information block is itself corrupted the original first receiver buffer address is retained and the apparatus again determines which later information block will have the next repeat of the required data block. If the later information block is not corrupted it will be stored in the receiver buffer at the stored first receiver buffer address.

This ARQ scheme can provide error free transmission on a noisy channel in one direction provided the return path is error free. Problems, however, occur when errors are introduced in both directions of the link. If an acknowledgement of a received information block is corrupted to become a non-acknowledgement, the contained data block would be repeated in a later information frame when neither required nor expected and so would be stored a second time but in an incorrect position in the receiver buffer if, on the other hand, a non-acknowledgement of a received information block is corrupted and is received as an acknowledgement, the data block in the later information block will not be the expected repeat data block but a first transmission of a new data block. This data block is not to be stored at the first receiver buffer address but at the next consecutive buffer address. Both cases will cause errors due to incorrect data block ordering in the receiving apparatus. Further, in the second case the transmitter will not retain the earlier possibly corrupted data block and so this can never be retransmitted.

It is preferable in these circumstances that the apparatus provides In each transmitted information block a Repeat Flag which indicates whether the information block contains a repeated data block and that the data block of the later information block is stored in the receiver buffer at the first receiver buffer address only if the Repeat Flag of the later information block is set. This prevents a falsely repeated block being incorrectly stored.

The data block of a corrupted information block may be stored in the receiver buffer if the information block has not previously been determined to be one expected to include a repeat transmission of a data block. This could cause an error if the data block had been corrupted and is not properly repeated due to further corruptions to overwrite the entry in the buffer but it will provide no error in these I circumstances if it was part of the information block other than the data block that had been corrupted.

In a preferred embodiment of the present invention the apparatus is further arranged to transmit information blocks having header data by which the apparatus can associate a transmission address with each information block and by which a like further apparatus can associate a receiver address with each information block and in which the receiver address in each information block is set to correspond to the transmission address of the information block last received by the apparatus.

With such an arrangement the apparatus can determine in which later information block the repeated transmission of a data block is expected to occur. This can be calculated from the transmission address of the information block last transmitted and the receiver address of the information block last received. The difference between these addresses is the time in information blocks necessary for an information block to pass to the further apparatus and for an information block containing the received address to get back to the originating apparatus. The apparatus can therefore determine when the information block containing the repeated data block is expected to arrive on the basis of this path delay plus any fixed overhead due to processing time at the transmitting apparatus, for example to receive a given number of successive acknowledge bits (as will be discussed later).

Preferably the apparatus is arranged so that sets of n consecutive information blocks are transmitted as a frame of information blocks, the header data of the information blocks including a Transmitted Synchronisation Bit (TSB) and a Transmitted Frame Number Bit (TFNB), the TSBs and TFNBs of the n consecutive information blocks of a frame forming an n-bit synchronisation sequence and an n-bit frame number, respectively, and further including a Received-Synchronisation Bit (RSB) and a Received Frame Number Bit (RFNB), the RSBs and RFNBs of the n consecutive information blocks of a frame forming an n-bit synchronisation sequence and an n-bit frame number, respectively.

In order to simplify the synchronisaton of the received information blocks it is preferred that each RSB and RFNB is the complement of the TSB and TFNB of the information block last received.

For n=8 there are 2,048 different addresses as there are $2^8$ distinctly numbered frames and eight distinct distinguishable addresses within each frame. Once an apparatus has synchronised to a stream of incoming information blocks by means of the TSBs in consecutive information blocks, in well known manner, the address associated with a transmitted frame can be determined from the frame number and the position of an information block within the frame. Similarly the RSB and RFNB, which correspond to the last TSB and last TFNB received by the further apparatus, can be used to determine the receiver address of the last information block received to enable the round trip time in information blocks between two apparatus to be calculated.

The TSB, TFNB, RSB and RFNBs can be very robustly protected from errors using flywheel circuits. By using a flywheel circuit to generate the addresses necessary for storing and transmitting required data blocks, operation can continue even when the incoming information blocks are corrupted. The flywheels can be arranged to generate the receive and transmit addresses until a given number of consecutive information blocks are corrupted, for example 16, with the count of corrupt blocks being reset to zero as soon as an information block is received uncorrupted having the correct TSB and TFNB.

It has been found that with this ARQ scheme the part of the information block header most seriously susceptible to errors is the acknowledge flag (ACK) which can cause corrupted blocks not to be repeated. This can cause particularly serious errors in systems communicating highly compressed data such as found in encoded video signals. Such signals are highly compressed and so need to be very well protected as errors will persist until refreshed which can be several seconds.

Corruption of the ACK flag can also cause non-corrupted blocks to be spuriously repeated. This does not cause errors but does reduce the efficiency of the link.

The ACK flag can be repeated several times within an information block to attempt to increase the error tolerance. However, examination of the fade vectors characteristic of a radio link shows that long bursts of consecutive errors occur which can invert all the several successive ACK bits. This would again cause errors, albeit less frequently. In order to make such an ACK scheme reasonably robust, the ACK bit would have to be repeated many times which would reduce the efficiency of the system because of the large number of data bits being transmitted.

A scheme which has been found to be far more preferable in these-circumstances is to use a header for each information block which includes an acknowledge bit which indicates whether the last received information block was corrupted and m further acknowledge bits each of which further acknowledge bits indicates whether a distinct earlier received information block was corrupted, the set of acknowledge bits being associated with m-1 consecutive information blocks.

With this scheme the receiving apparatus has to wait for m+1 consecutive, ACK flags to arrive before being able to determine that a block was received uncorrupted. This scheme requires m+1 ACK bits in the header of each block, referring to the current block, the previous block, previous-but-one-block, etc. As the bits referring to any particular block are effectively spaced m−1 information blocks apart, the scheme is much more robust than having them all within the same information block. The penalty to pay for this scheme is the added path delay of a further m information blocks. The apparatus requesting a retransmission of a data block needs to take into account the fact that the further apparatus will not retransmit a data block until the last acknowledge bit has been received. This penalty however is small when compared with the main round trip ARQ delay. The currently preferred number of ACK bits is at least three for an H.261 coded video signal transmitted over a DECT interface having a bit error rate (BER) of up to $10^{-2}$.

For maximum robustness a data block should be retransmitted if any one acknowledge bit of the m+1 acknowledged bits indicates an information block was received corrupted by the further apparatus. Other schemes may be used, for example majority voting or an odd number of acknowledge bits.

The TME error flag generated by the receiver could also be used in conjunction with the ACK bits to make the decision making process of what information blocks have been properly acknowledged more robust. It should be appreciated that a TME flag may indicate no errors even if errors have occurred so the TME flag cannot be taken as infallible confirmation that an acknowledge bit in an information block which has no TME signal associate with it is correct. The use of TME error signals in conjunction with acknowledge bits may allow a fewer number of acknowledge bits ie two rather than three for example, yet still attain as robust or more robust an acknowledge system.

BRIEF DESCRIPTION OF THE DRAWINGS

An embodiment of the present invention and its principle of operation will now be described, as applied to a communications system for transmitting a compressed video signal over a radio link in which the output bitstream of an H.261 video coded is transmitted over a DECT radio link, with reference to the accompanying drawings of which:

FIGS. 2 and 4 are tables showing the structure of he information blocks and frames of information blocks, respectively, using the apparatus of FIGS. 1 and 2;

FIG. 6 is a table showing an exemplary sequence of typical ACK bit outputs from the apparatus of FIGS. 2 and 5;

DETAILED DESCRIPTION OF EXEMPLARY EMBODIMENTS

Figure 1:
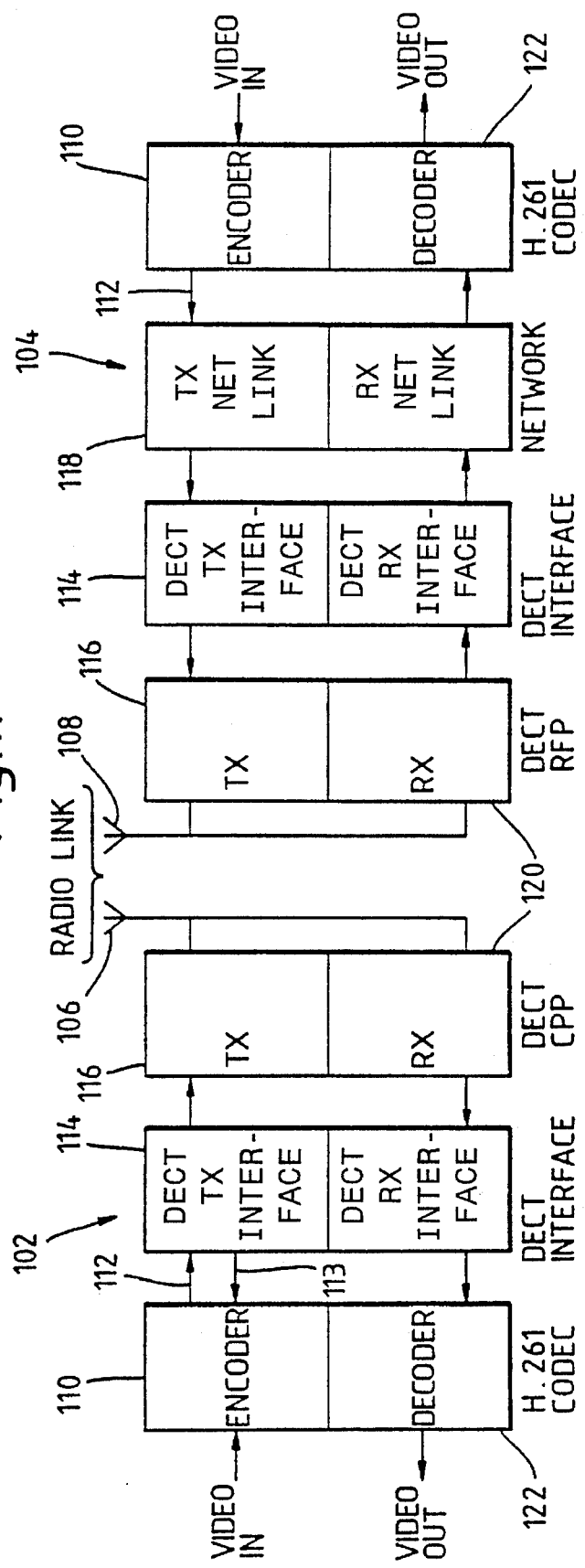
FIG. 1 is a schematic drawing of a communications system employing apparatus according to the present invention for providing video transmissions over a radio link.

The system shown in FIG. 1 was designed for transmitting video over radio links and is based on the CCITT Recommendation H.261 and the proposed DECT standard. Data rates of 64 kbit/s-384 kbit/s were studied, ie where H.261 and DECT overlap. DECT is the emerging Digital European Cordless Telecommunications standard due for ratification by ETSI in 1992. It will be a Time Division Multiple Access (TDMA) system utilizing both halves of a duplex link operating on the same frequency and working in the 1.9 HGz band. The data part of the bitstream is split into 10 ms DECT frames with each DECT frame consisting of 24 time slots. Normally the first time slots are used to transmit from the Radio Fixed Part (RFP) to the Cordless Portable Part (CPP) and the last 12 time slots are used for transmission in the opposite direction. Each time slot can be allocated to one of ten frequencies and can hop to another available frequency, on a frame basis, in the event of the signal to noise ratio and bit error rate on this current frequency becoming too poor for adequate transmission. Each time slot carries 320 user bits so the maximum channel capacity is 384 kbit/s. The essential difference between a radio channel and other existing transmission facilities is the error performance. The error characteristics have three main constituents:

i. random errors occurring as a result of low RF signal levels;

ii. short error bursts coming from certain types of interference and extension of single random errors by modulation techniques;

iii. long error bursts due to deep fading, shielding or frequency hopping.

The BER for a radio link is typically between $10^{-2}$ and $10^{-5}$, significantly worse than for a fixed link.

Fading errors were simulated using the BT Lab's Wide-Band Fading Simulator (WFS). The WFS produces bit error vectors for the performance of DECT in an Additive White Gaussian Noise (AWGN) environment with Rayleigh fading. Analysis of the output of the WFS showed that fades had two main characteristics:

1. fades produced very high intensity bursts of errors with clear periods between fades;

2. the error rate during the fade was very high with possibly more than half the bits in error.

It should be noted than in a full DECT implementation, handover will occur when the error exceeds approximately $10^{-3}$. In the simulations only about 5% of corrupted blocks had error bursts which were correctable by even a powerful error corrector.

Referring to FIG. 1 a communications system comprises a pair of apparatus 102 and 104, each according to the present invention, linked by a radio link established between radio antennae 106 and 108. Each of the apparatus 102 and 104 has an H.261 encoder 110 which accepts video signals as an input and encodes them as a bitstream of coded video signals on line 112. A DECT interface 114 converts a respective bitstream on line 112 into a format suitable for transmission by a DECT standard transmitter 116. The apparatus 102 is associated with a single encoder 110. The apparatus 104 connects the DECT interface 114 to a remote encoder 110 via interface network 118. The network 118 could be a radio link or some fixed land lying link, for example.

DECT transmissions from each of the transmitters 116 are received at a respective receiver 120, the received signals being passed via the respective DECT interface 114 for conversion to a bitstream suitable for decoding by a respective H.261 decoder 122 to provide a video output signal.

Figure 2:
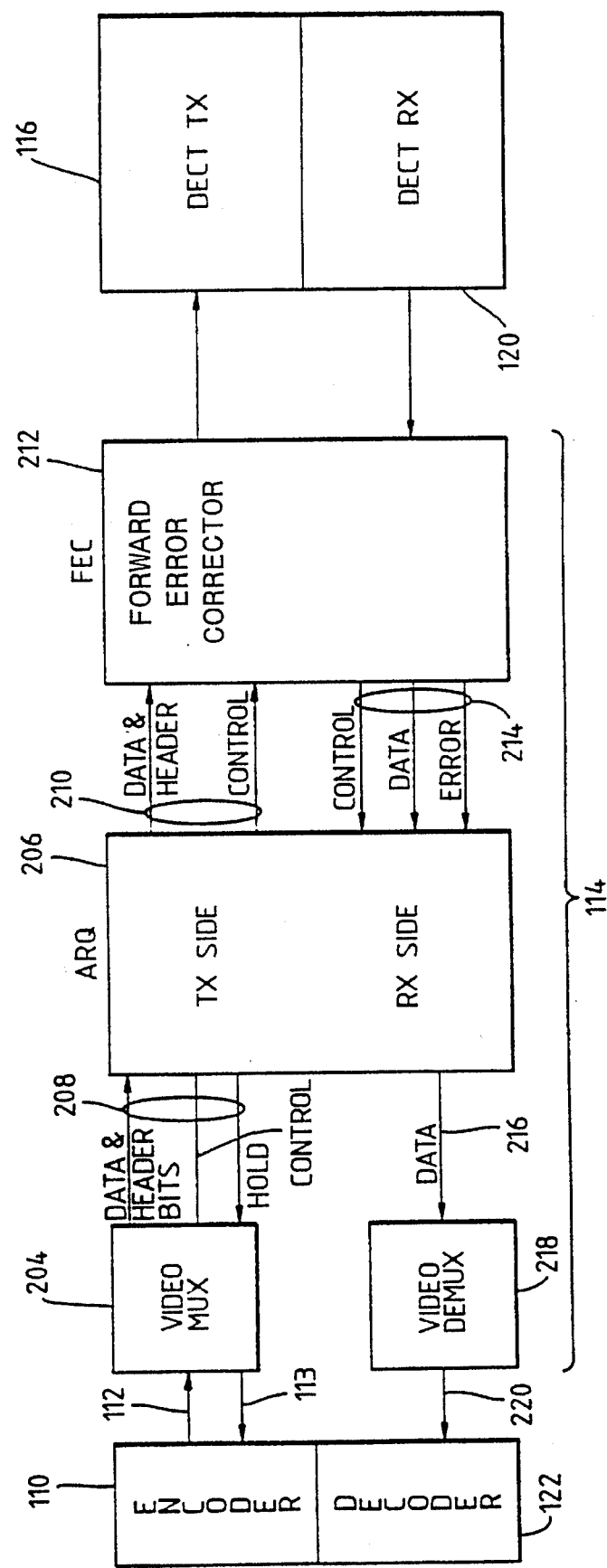
FIG. 2 is a schematic drawing of one of the apparatus of FIG. 1.

Referring now to FIG. 2 there is shown in more detail the DECT interface 114 of the apparatus 102 of FIG. 1 showing the three processes carried out on the data flowing to and from the H. 261 encoder/decoder 110/122 and to and from the DECT transmitter 116 and DECT receiver 120.

The ARQ scheme of the present invention is controlled by an ARQ board 206 which controls the interface of the H.261 encoder/decoder 110, 122 to the DECT transmitter/receiver 116, 120. The coded bitstream from the encoder 110 is passed to a video multiplexer 204 which combines the compressed video data blocks in the bitstream 112 with some internally generated items of the header information required for the information block namely the TSB and TFNB together with a stuff block bit which is inserted when there is no video data block to be included in the next information block to be transmitted. This function of generating these items of the header of the information block could be performed by the ARQ board 206, but in the present case it was found more convenient to reprogram the video multiplexer 204 to carry out this function.

Buffer control signals are passed from the video multiplexer 204 to the encoder 110 via line 113 to control the operation of the encoder in known manner.

The video data block, header bits and control signals are passed to a Forward Error Corrector (FEC) 212 via a data and control bus 210. The FEC 212 employs a Reed-Solomon (63,59) code although any other system of forward error detection could be employed. The FEC provides a check bit calculation and adds a checksum to the information blocks to put them in a suitable form for the DECT transmitter 116 to transmit them.

Received information blocks from the DECT receiver 120 are input to the FEC 212 which determines whether the information block has been corrupted and outputs a too Many Errors (TME) signal on bus 214 as appropriate. As will be explained later, the FEC indicates if the data has been corrupted but does not attempt to correct any errors.

The information blocks together with the error flag and control signals are passed via bus 214 to the receiver side of the ARQ board 206.

The ARQ board 206 determines which information blocks, if any, should be output via a data bus 216 to a video demultiplexer 218 for passing onto the H.261 decoder 122 via output line 220.

The information block structure employed in this embodiment of the present invention is shown at FIG. 3. It has a header containing the following sections:

a Transmitted Synchronisation Bit (TSB), which comprises one bit of an 8-bit synchronisation word sequence;

a Transmitted Frame Number Bit (TFNB), which comprises one bit of an 8-bit frame number;

a Repeat Flag, which indicates whether the information block contains a retransmitted data block;

a Stuff Flag, which signals if the information block contains normal data or stuffing data;

a Received Synchronisation Bit (KSB), which is set to be the complement of the last transmitted synchronisation bit received by the decoder;

a Received Frame Number Bit (KFNB), which is set to be the complement of the last TFNB received by the decoder;

a series of three Acknowledgement Bits (curr ACK, prev ACK1, prev ACK2), which indicate respectively whether the current, the last and the second last information blocks received by the distant apparatus were received uncorrupted;

a video data block; .and check-sum bits.

In the present embodiment which is transmitting video data it is only necessary to include a single bit stuff flag which indicates whether the data block is stuff data or coded video data. Other applications may need no stuffing block for example audio, whereas other application may need a more complex indication of the type of data included in the information block which may require more bits than the one bit of he present embodiment.

A series of eight information blocks, as shown in FIG. 3, form a frame of information blocks as shown in FIG. 4. The eight transmitted synchronisation bits of consecutive information blocks form an 8-bit synchronisation word sequence whilst the corresponding eight transmitted frame number bits form an 8-bit frame number. The 8-bit frame number gives $2^3$ possible addresses. The synchronisation word can be in one of eight different positions giving a further eight addresses for each information block number equal to 2,048 addressable information blocks.

in the present case the synchronisation word chosen was 00011011 and the frame numbers cycle from 0000000 through to 1111111 on consecutive frames. The TSBs and the TFNBs are used to calculate an address for any information block within the transmitted frames as will be described lazer. Similarly the RSBs and RFNBs are used to provide addresses of information blocks but the complement is used so that the apparatus does not attempt to synchronise to the RSBs but rather to the TSBs. The information as to which information block was last received by the distant apparatus can be derived in an analogous fashion from the RSB and RFNB.

Figure 5:
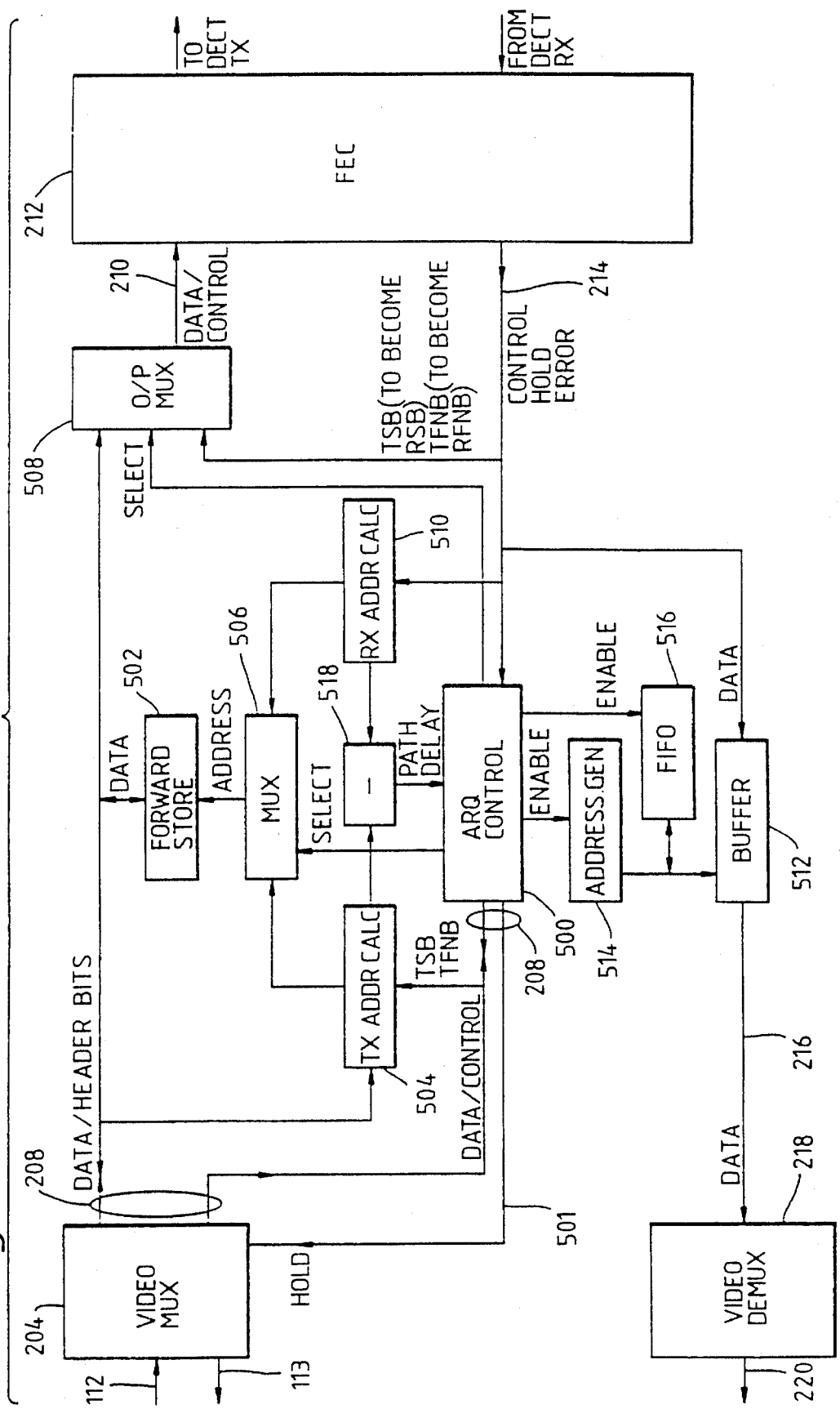
FIG. 5 is a more detailed schematic diagram of the apparatus shown in FIG. 2.

FIG. 5 shows a simplified block diagram of the interface 114 of FIG. 2 to which reference will now be made to provide an overview of its operation. The ARQ scheme of the present invention includes the following principal operations: transmitting data blocks, retransmitting data blocks which arrived at a further apparatus having information blocks transmission errors, receiving data blocks into a the receiver buffer and inserting repeated data blocks into the correct position in a buffer.

Compressed video data from the H.261 encoder (see FIG. 2) is passed to the video multiplexer 204 via bus 112. The video multiplexer 204 assembles the information blocks into the format shown at FIG. 3 and generates the block addresses and time slot lengths which as with the header information previously referred to could instead be generated by the ARQ board 206.

During normal operation, ie when no repeats have been requested, the next block of compressed video data from the H.261 encoder is stored in a forward store 502. The address at which the data block is stored in the forward store 502 is calculated from the TSB and TFNB by a transmitter address calculator 504, and used by a multiplexer 506 to address the appropriate memory location in the forward store 502. In this normal mode of operation the data block is also passed to an output multiplexer 508 which assembles the RSB, RFNB header bits which, as described earlier, are the complement of the TSB and TFNB of the last received information block.

The information block is then passed via the data/control bus 210, under the operation of a select signal from the ARQ controller 500 to the output multiplexer 508, which passes the information block to the FEC 212. The FEC 212 performs a check bit calculation on the information block, inserts the appropriate check bits in the information block and passes the completed information block to the DECT transmitter 116 (see FIG. 2) for transmission to a remote apparatus.

If, on the other hand, a repeat request has been received from the remote further apparatus, an information block containing the required repeated data block is to be passed to the DECT transmitter 116 instead. In this instance the required data block is not obtained from the video multiplexer 204 but is extracted from the forward store 502. In these circumstances the ARQ controller 500 passes a hold signal via a line 501 of the bus 208 to the video multiplexer 204. The data to be read from the forward store 502 has an address given by the RSB and RFNB of the last received information block. The actual address is calculated from the RSB and RFNB by a receive address calculator 510 which address is passed to the multiplexer 506 to provide access to the required data block stored in the forward store 502.

The required data block is read from the forward store 502 and stored once again but this time at the address of the information block in which it is going to be retransmitted. This is achieved by using the transmitter address calculated by the transmitter address calculator 504 which transmitter address is provided to the multiplexer 506 for this purpose. By storing the repeated data block at the new transmitter address it is available for a yet further repeat transmission if that information block is itself corrupted.

The size of the forward store 502 is dependent on two factors; the number of allowable repeats of the same data block and the round trip delay between the two apparatus forming the duplex communications system. As discussed previously the round trip delay is the time measured in information block periods between an information block containing a transmitter address being transmitted and the same address arriving as a received information block address at the apparatus. With the round trip delay of 20 and two repeats allowed the forward store must be able to store 40 data blocks together with an overhead dependent on the number of consecutive acknowledge bits that are to be received before a given data block is acknowledged as being properly received.

It has just been described how a repeat transmission of a data block can be triggered in response to information received from the remote apparatus on failure to have a satisfactory acknowledgement. The received information blocks also contain compressed video data from the remote apparatus, which if non-corrupted are to be passed to the H.261 decoder 122 of FIG. 1.

Consider first normal receive operation. In this case a received information block from the DECT receiver 120 of FIG. 1 is received and passed to the FEC 212 which provides an Too Many Errors (TME) signal to the ARQ controller 500 which indicates whether an error has been detected.

If no error was detected, the received data block in the information block is stored in a buffer 512 at a write address calculated by an address generator 514. A new write address is provided by the address generator 514 whenever a non-repeat, non-stuff block is received. The address generator 514 also provides a read address for the next data block to be extracted from the buffer 512 to be passed via bus 216 to the video demultiplexer 218. The read address is generated by subtracting an offset from the write address. The offset must be greater than the path delay multiplied by the number of retransmits allowed plus allowance for the multiple acknowledge bits if used. This could be calculated dynamically but the system of the present embodiment uses switches to set up the offset. This offset is kept constant by not reading from the buffer and sending NOPs to the video demultiplexer 218 if a repeat or stuff block is received.

If a corrupt block is received at the DECT receiver 120, the FEC 212 signals this to the ARQ controller 500 by the TME signal which stores the current write address generated by the address generator 514 in a FIFO store 516.

The FIFO 516 must be big enough to store a number of addresses equal to the path delay multiplied by the number of retransmits available to cover the worst case of every block being in error, plus an allowance for the additional delay if multiple acknowledge bits are used.

The interface 114 also includes a path delay calculator 518 which compares the transmitter address of the information block last transmitted from the apparatus with the receiver address determined by the receive address calculator 510. The receiver address generation is protected by a flywheel circuit to counter corruption of received information blocks. Since the received address was the transmitted address sent out previously, the path delay or the time taken to go to the remote apparatus and back again can be calculated in terms of information block periods by a differencing operation together with any offset required for successive acknowledge bits. The path delay which is about 20 blocks for 128 kbit/s link, is used to determine in which lazer information block the repeat transmission of the data block is expected to occur.

This is achieved by securing the TME flags in a store (see FIG. 13) each of which is read out a path delay later. The value of the TME flag read out at any time gives the required indication that the currently received information block is or is not expected to contain a repeated data block.

The ARQ controller 500 will, if the information block containing the repeated data block is non-corrupted and the data block is a non-stuff block, use the buffer address previously stored in the FIFO 516 to store that repeated data block at the appropriate position in the buffer 512 so placing the repeated data block in its correct position relative to the other received data blocks. In this case data is not read out from the buffer 512 and passed to the video demultiplexer 218 as the write address has not been incremented by the address generator 514 which in this embodiment maintains the offset between the read and write pointers from the buffer 512.

When an information block arrives which has not been previously determined to contain a repeated data block but which is received corrupted, then that data block is stored in the buffer 512 even though a repeat transmission of that data block will be requested. If the data block is not successfully repeated then that data block will be output to the video demultiplexer in due course notwithstanding that it may have a possible error in it. If the data block is successfully repeated then the non-corrupt data block will overwrite the possibly corrupt data block already in the buffer 512.

When the apparatus receives a corrupted data block it will transmit consecutive information blocks in which the three ACK bits are set accordingly, an example of which is shown at FIG. 6 in connection with corrupt information block number 2. The Curr. ACK flag of block 2, the Prev. ACK1 flag of block 3 and the Prev. ACK2 flag of block 4 are set to 0 to indicate corruption of the information block 2.

The ACK signals for a given information block are spread over three consecutive blocks which number was selected because of hardware limitations. The ACK bits are transmitted to the remote apparatus as part of the data stream of information blocks.

When The apparatus of FIG. 5 receives information blocks, the ACK bits arrive at the ARQ controller 500 which stores the Curr. ACK for two blocks before use and the Prev. ACK1 for one block before use. The Prev. ACK2 bit is used immediately. This means that a delay of two information blocks is introduced for repeated data blocks so the forward store 502 must be two blocks larger than it would be if only one ACK bit were used. Also the address difference generated by the address generator 514 must account for this delay.

in the apparatus of FIG. 5 the ARQ controller 500 compares the three ACK bits for a given information block. There are two possible errors in the return path. Firstly, an information block may originally be flagged as being uncorrupted but one or more of the ACK bits is subsequently corrupted and a repeat is incorrectly requested. Secondly, a repeat transmission of a data block is required and requested but the ACK bits are corrupted in successive information blocks and the request to repeat a data block is not received.

The second case is the more serious because the remote apparatus will be expecting an information block to contained repeated data but instead a block of new data will arrive. The data block of the corrupted information block cannot then be repeated because the address of that data block in the forward store 502 will have been lost. An error will appear on the screen of the decoded video signal when the corrupted block which had been stored in the buffer 512 arrives at the video multiplexer 218 of the remote apparatus. The use of three ACK bits greatly decreases the likelihood of this error occurring but it does mean that more blocks are repeated than are absolutely necessary, because the first situation is more likely to occur, which does waste some transmission time. However, because the video multiplexer requests the H.261 coder to hold when a repeated data block is transmitted it should reduce the number of stuff blocks that need to be sent. The overall reduction in throughput should not, therefore, be too great.

The first error noted above will not cause errors on reconstituting the video signal because the remote apparatus will not be expecting a repeated block and on inspection of the repeat flag will determine that it should simply ignore the received data block and discard it.

It has been found that an error detector provides much more reliable detection of errors than an error detector/corrector with the same number of check bits, with a small amount of correction ability drastically reducing the detection reliability. The FEC 212 of FIG. 5 is therefore used solely to provide the TME signal to the ARQ controller 500 and no attempt is made to correct the information block, rather reliance is placed on obtaining a repeated data block in a later information block to correct the possibly corrupted data block just received.

The ARQ scheme employing three ACK bits in successive information blocks copes well with high intensity error bursts but high continuous error rates also need to be considered. For selective repeat ARQ schemes, optimum block sizes for giving continuous random error rates can be calculated as discussed in an article entitled "ARQ Protocols with Adaptive Block Size Perform .Better over a Wide Range of Bit Error Rates" by Armeldo, Martins and Alves, IEEE Transactions on Communications vol 38 no 6 June 1990. A formula for the throughput can be calculated and is given by $$T=m \cdot (a-p_b) \text{ where } P_b=1-(1-)^n \text{ and } m=(n-h)/n$$

where:

$p_b$=block error probability;

$p_e$=bit error probability;

n=block size in bits; and h=number of overhead bits in the block.

Assuming a maximum continuous random error rate one may encounter is $10^{-3}$, from the graph shown in the referenced article the optimum block size is found to be about 250 bits. Using a Reed-Solomon scheme with 43, six-bit symbols, this gives 259 bits in the block, including the synchronisation bit. There are 24 check bits and nine overhead check bits (assuming the ACK is repeated three times) so:

n 32 259 and h=33, therefore m=0. 873;

$p_e$=0.001, therefore $P_b$=1−(0.999)$^{259}$=0.228; and

T=0.873×0.772−0.674.

This shows that the throughput is only about two thirds. For larger block sizes it gets worse, for example for bit blocks T=0.624. Therefore, if we start with a 62 kbit/s signal it would require a bandwidth on the DECT link of 64/0.674 =95 kbit/s which requires three DECT time slots of 32 Kbit/s each.

In order to be able to cope with random error rates of $10^{-3}$ one needs to consider block sizes of around 250 with around 30 to 35 overhead its in total. This would allow one to use three DECT time slots for a 64 kbit/s call or six time slots for 128 kbit/s call. The short term, high intensity bursts (fade) performance is much higher than this as long as the average is no greater than $10^3$.

Experiments with the above apparatus have shown that in order to successfully repeat all error blocks at least two repeats must be allowed for. Taking into account the round trip delays encountered we found this required a size of buffer 512 of around 128 blocks when 379 bit blocks were used or 192 blocks when 259 bit blocks were used. This represents a delay of around 128 ms at 384 kbit/s, 384 ms at 128 kbit/s or 768 ms at 64 kbit/s. These were not the optimum buffer sizes but as can be seen very large delays are incurred. Methods of reducing the delay are currently under investigation.

As a comparison, a scheme using interleaving and error correction with no AKQ could interleave to a depth of 96 using 259 bit blocks for the same delay penalty. This could cope with some long error bursts but only if they occur infrequently judging by the frequency in size of error bursts in simulated fades, it is expected that the ARQ scheme of the present invention will perform better under fade conditions.

The apparatus of FIG. 5 will now be described in more detail with reference to FIG. 7 which is a circuit diagram of an ARQ board 700 comprising that portion of the apparatus of FIG. 5 between the video multiplexer and demultiplexer 204, 218 and the FEC 212.

A clock bus 702 carries a 4 bit clock signal to coordinate the ARQ controller 500 which maintains synchronism of the ARQ board 700 concerned with generating the information blocks to be transmitted.

The coded video data together with the TSB, TFNB, and SF bits generated by the video multiplexer 204 of FIG. 2 to be transmitted in an information block is input to a transmitter side controller 704 via line 706 together with a 5 bit transmitter attribute signal via an attribute bus 708.

The 6 bit attribute bus 708 provides a method of indicating to the ARQ board 700 the type of data on the data bus at any given particular time. The attribute bus contents change synchronously with the items of the information block being constructed and transmitted. The data types include TSB<data, checksum, end of block and NOP. Each data type is allocated a unique 6 bit number to allow identification of the data type by the components of the ARQ board 700 as required.

Some of the data types are used internally by the ARQ board 700, for example the TME and end of block (EOB) flags which are not transmitted via the DECT transmitter 116.

When the transmitter attribute designates that video data is being input to the transmitter side controller 704, a data valid signal is output on a line 710 and is input to a transmitter store 712. When the transmitter attribute signals on bus 708 indicate that an end of information block has been reached, an end of block signal is output on a line 714 and input to the transmitter store 712. The transmitter side controller 704 also generates a synchronisation signal which is output on line 716 and which is also input to the transmitter store 712. This synchronisation signal is also used to synchronise the operation of the receiver side of the apparatus.

The transmitter side controller 704 also generates a 10 bit transmitter address on the bus 718 which is also input to the transmitter store 712.

Figure 8:
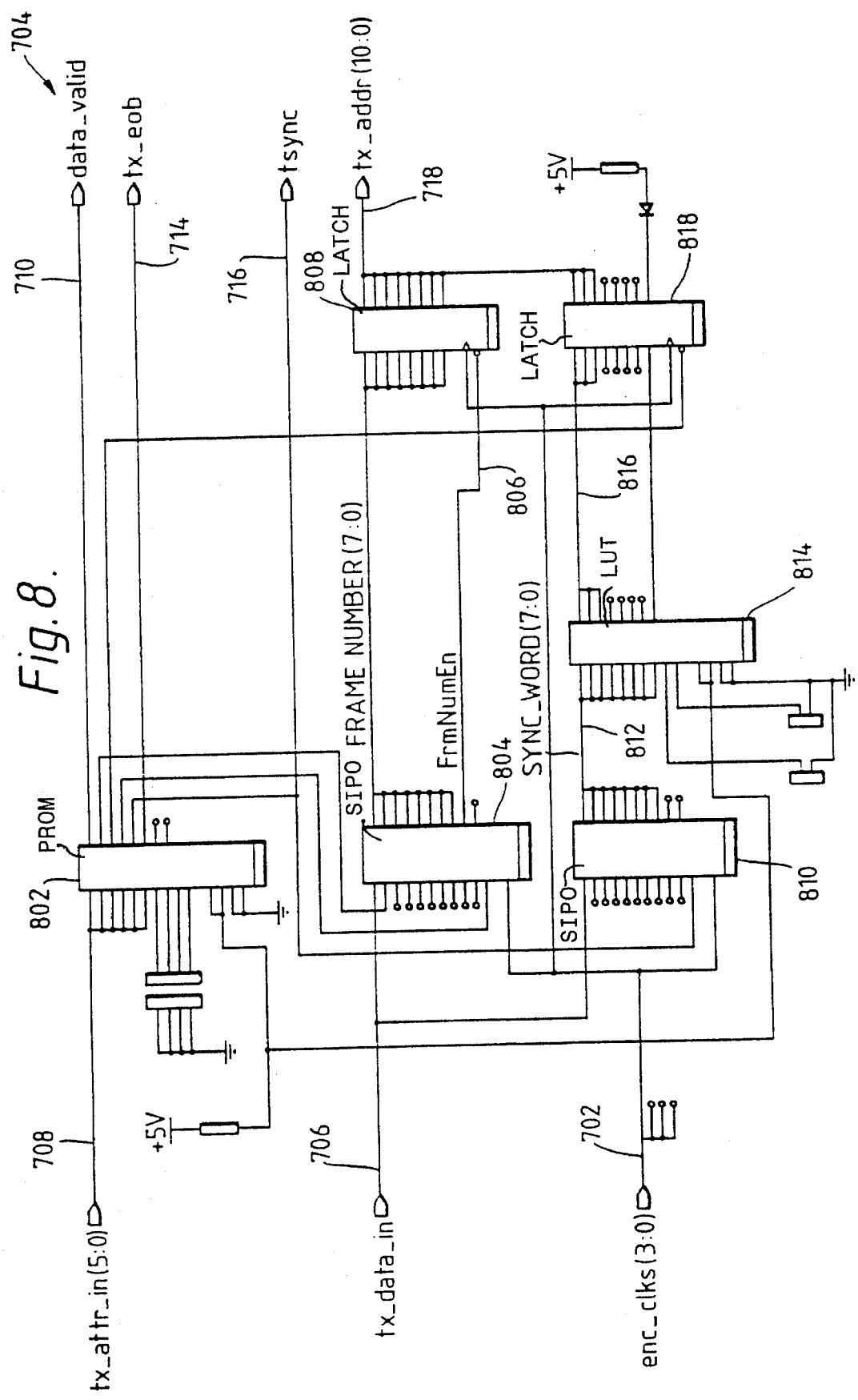
FIG. 8 is a circuit diagram of the transmitter side controller of the apparatus of FIG. 7.

The transmitter side controller 704 is shown at circuit board level in FIG. 8. The transmitter attributes on line 708 are input to a PROM 802 which provides output signals indicating the nature of the bit at the current position in the information block. A Single in Parallel Out (SIPO) circuit 804 generates an 8 bit frame number once every eight information blocks which frame number increments once for each new frame of information blocks. At the end of each set of frames a frame number enable signal is generated by the SIPO 804 and passed via line 806 to a latch 808.

The TSBs from consecutive information blocks are entered into the SIPO 810 which outputs on bus 812 the synchronisation word rotated by a number of bits given by the information block number within the frame. This rotated synchronisation word is passed to a look up table 814 which outputs on bus 816 the block number within the frame for the current information block. This is passed to a latch 818. The frame number and block number are combined to form a 11 bit transmitter address by latches 808 and 818 and output on the transmitter address bus 718.

Figure 7:
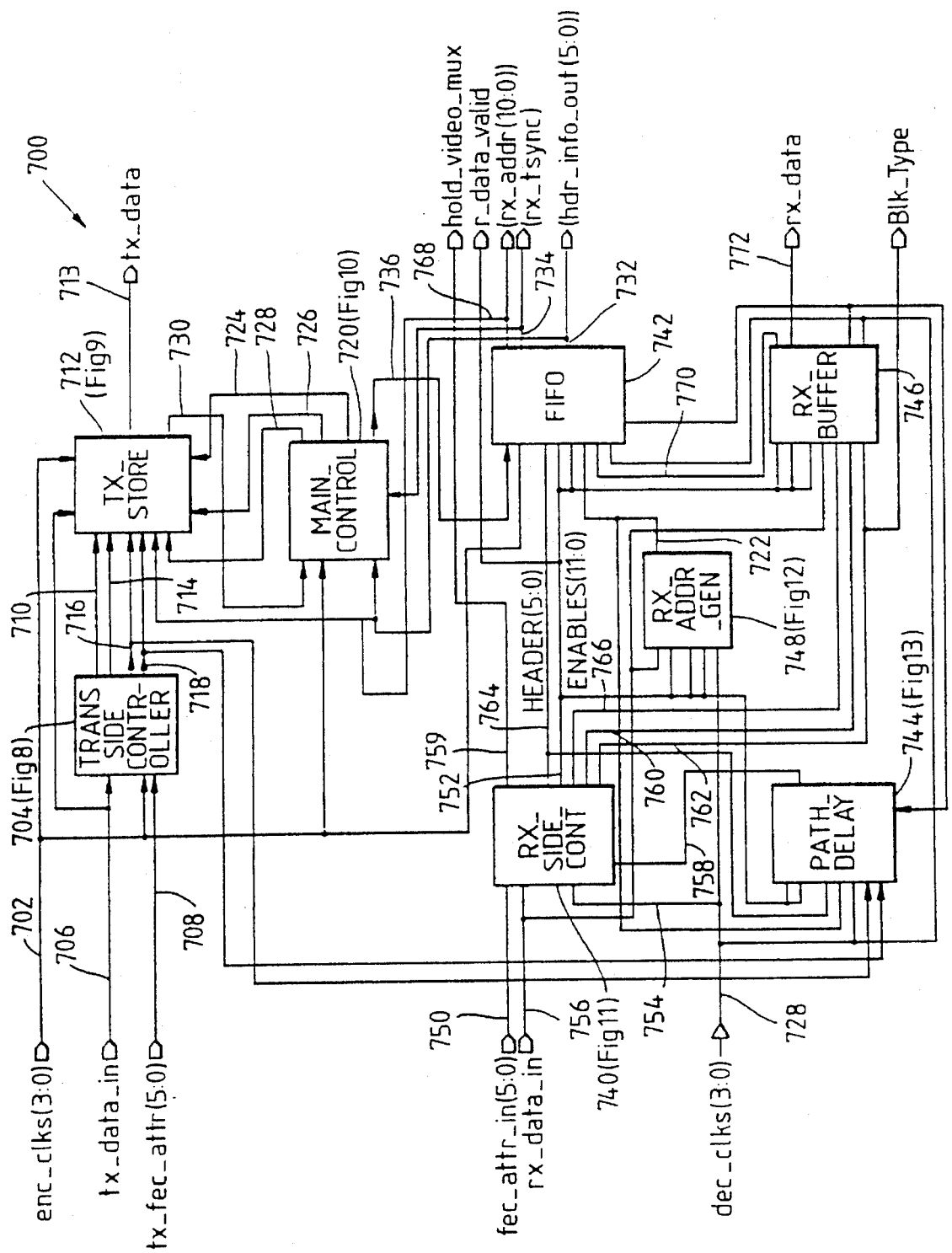
FIG. 7 is a schematic diagram of the circuit board of the apparatus of FIG. 5.

The transmitter store 712 of FIG. 7 assembles the header and video block data into an information block for transmitting and/or storing in the forward store 502 (see FIG. 5).

Figure 9:
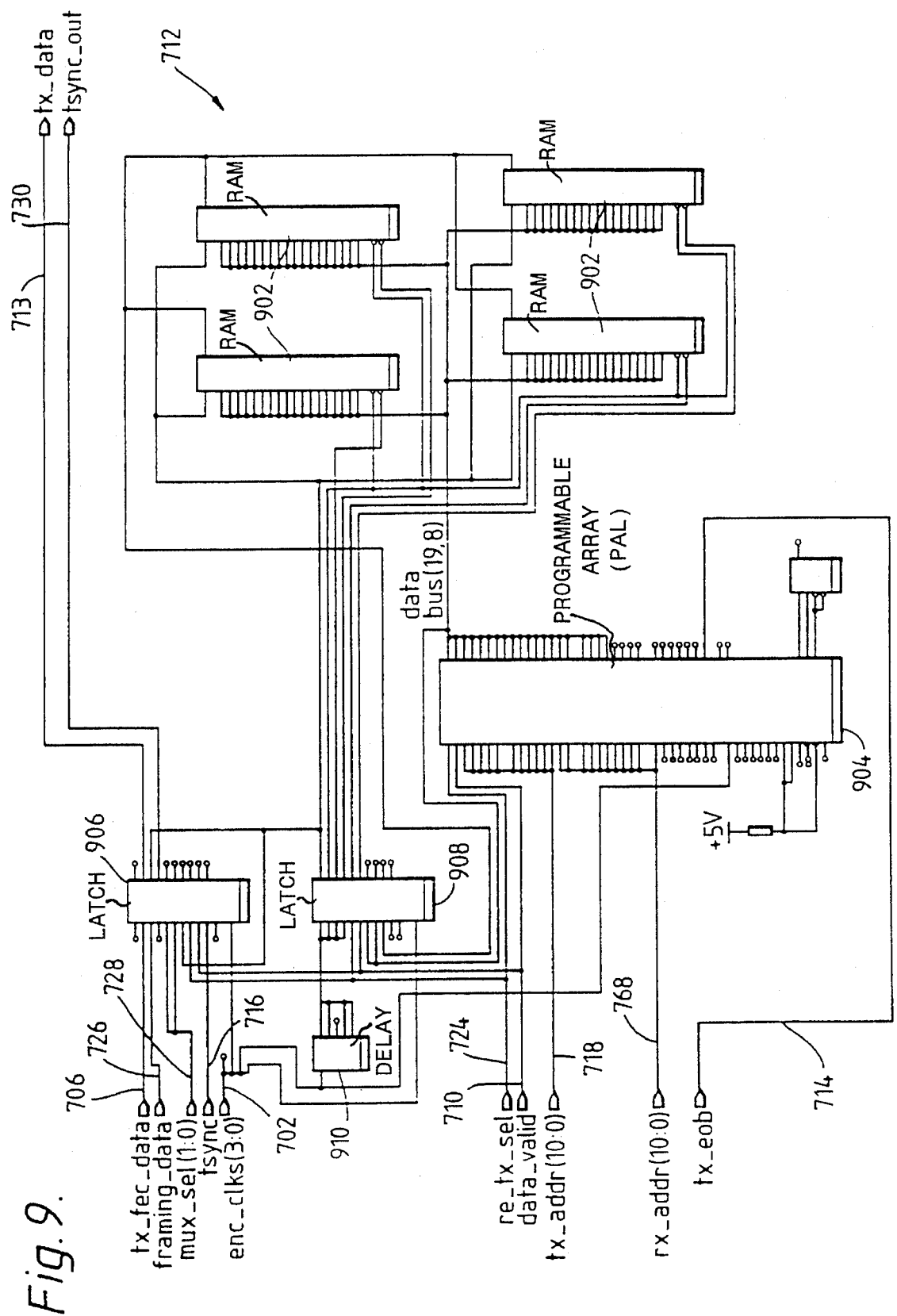
FIG. 9 is a circuit diagram of the transmitter store of the apparatus of FIG. 7.

The transmitter store 712 of FIG. 7 is shown in more detail in FIG. 9 and includes four RAM chip memories 902 in which is stored the video data blocks and associated stuff flag of information blocks that have been or are about to be transmitted.

The transmitter end-of-block signal from the transmitter side controller 704 on line 714 controls a programmable array 904 to output the data block to be stored in the forward store and/or transmitted via a holding latch 906. The data block to be transmitted is read from the latch 906 and stored in the RAM memory 902 in case a repeat transmission is required. If the transmission is a repeat transmission the data to be transmitted is read out of RAM memory 902 via the latch 906 and again stored in the new data block position in the chip memory 902 in case it is necessary to provide a yet further repeat of this data block.

The inputs to the programmable array 904 are the transmitter address on line 718 obtained from the transmitter side controller 704 of FIG. 8, and an analogous receiver address being the receiver address of the last received information block on line 722, the data valid input on line 710 and a repeat transmission selection signal on line 724 generated by a main control 720 (see FIG. 7).

When the repeat transmit select line 724 goes high the data to be sent is a repeat transmission of the data block which was in the information block referenced by the receiver address of the last received information block. In this case then the data is retrieved from the chip memory 902 by using the receiver address on line 722, this data is read from the chip memory 902 and passed to the latch 906 and transmitted on the transmit data line 713. The data is also read from the latch 906 back into the forward store memory chip 902 by using reference to the current information block transmitter address obtained from line 718.

If this transmission of the information block is also corrupted then it will be in the proper position in the store 902 to be retrieved on the basis of the future receive address for retransmission. The latch 902 receives the data to be transmitted if the video multiplexer has not been out on hold, ie if a new information block is to be transmitted. The information block enters latch 906 where it is available for storing in the RAM memory 902 at the current transmitter address.

The header information is input to latch 906 via line 26 which information is co-ordinated by the main controller 720 (see FIG. 7). A multiplex select signal is input on a multiplex select line 728 (see FIG. 7) which determines whether information is to be read from the memory 902 for transmission or whether a new video data block is to be transmitted. The transmitter synchronisation signal oneline 716 controls the timing of the latch 906. The 4 bit clock signal on line 702 coordinates the timing of the various elements of the TX store of FIG. 9.

A delay line 910 provides control signals having the correct phase wish respect to the encoder clock signal input on line 702. The control signals from the delay line 910 are used by the latch 908 to provide the control signals for access to the memory RAM chips 902.

The transmitter synchronisation signal input on line 716 is output on line 730 (see FIGS. 7 and 9).

Figure 10:
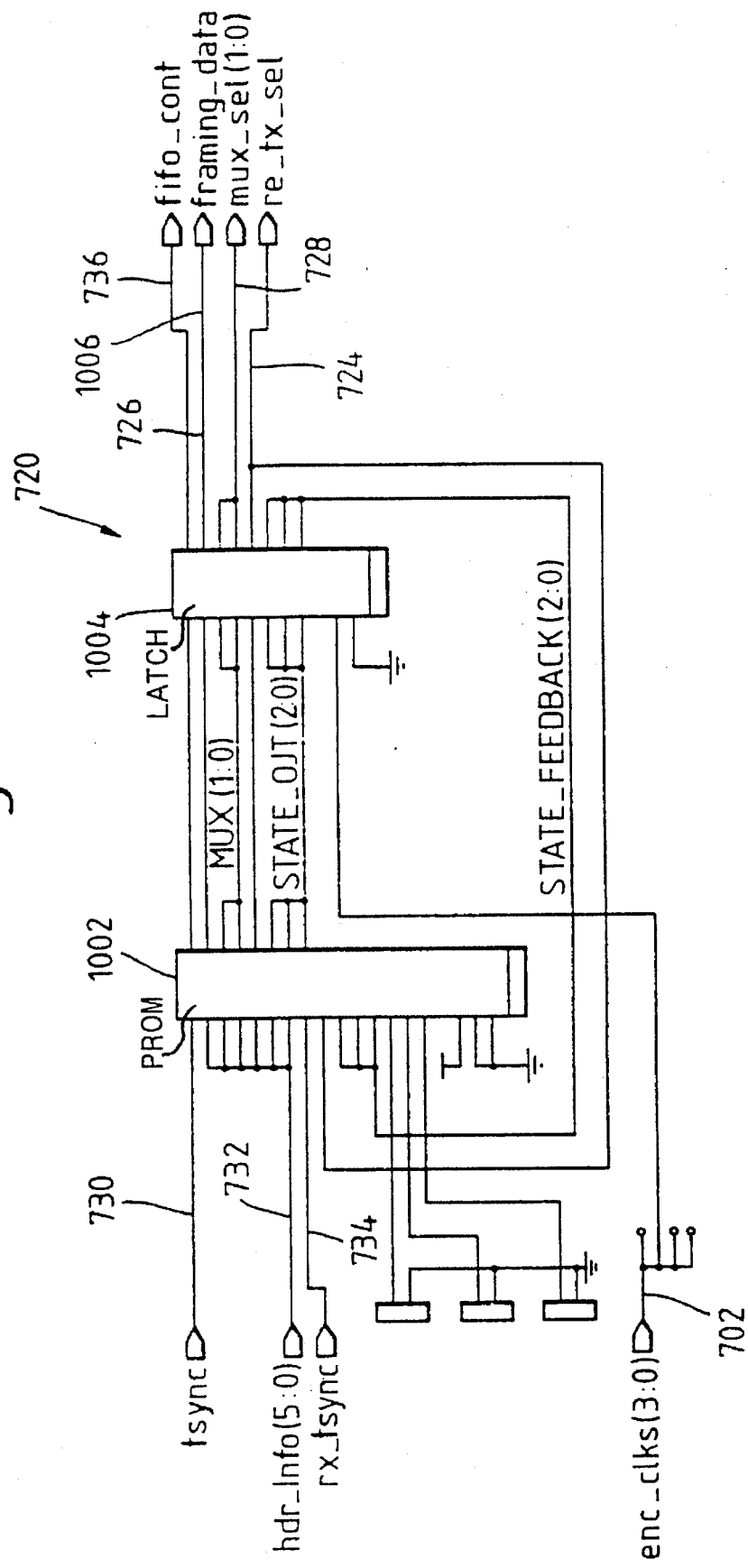
FIG. 10 is a circuit diagram of the main controller of the apparatus of FIG. 7.

Referring now to FIG. 10 there is shown the main controller 720 of FIG. 7 shown in more detail. The main controller 720 is a state machine it provides framing data on line 726 in response to the main controller 720 on input line 732. It comprises a PROM 1002 and a latch 1004. The latch 1002 receives The transmitter synchronisation signal on line 730, header information on a header information bus 732 and a receiver synchronisation signal on a bus 734. The operation of the main controller is co-ordinated by means of clock signals on bus 702. The main controller provides a FIFO control signal on a line 736, framing data on the line 726, a multiplex select signal on the line 728 a repeat transmission select signal on the line 724, the last three of which are input to the transmitter store 712. Framing data and output line 1106 is provided by checking the received TSB and TFNB bit input on line 734. The FIFO control signal on line 736 is used to access the latches holding the header information. The multiplex select signal on line 728 is used to select between framing data and video data in latch 906 of the transmitter store 712. The controller 720 also checks the ACK bits before generating a repeat transmission select signal on the line 724.

Turning now to the receiver side of the interface board 700 of FIG. 7, there is a receive side controller 740, a FIFO 742, a path delay generator 744, a receiver buffer 746 and a receiver address generator 748.

Figure 11:
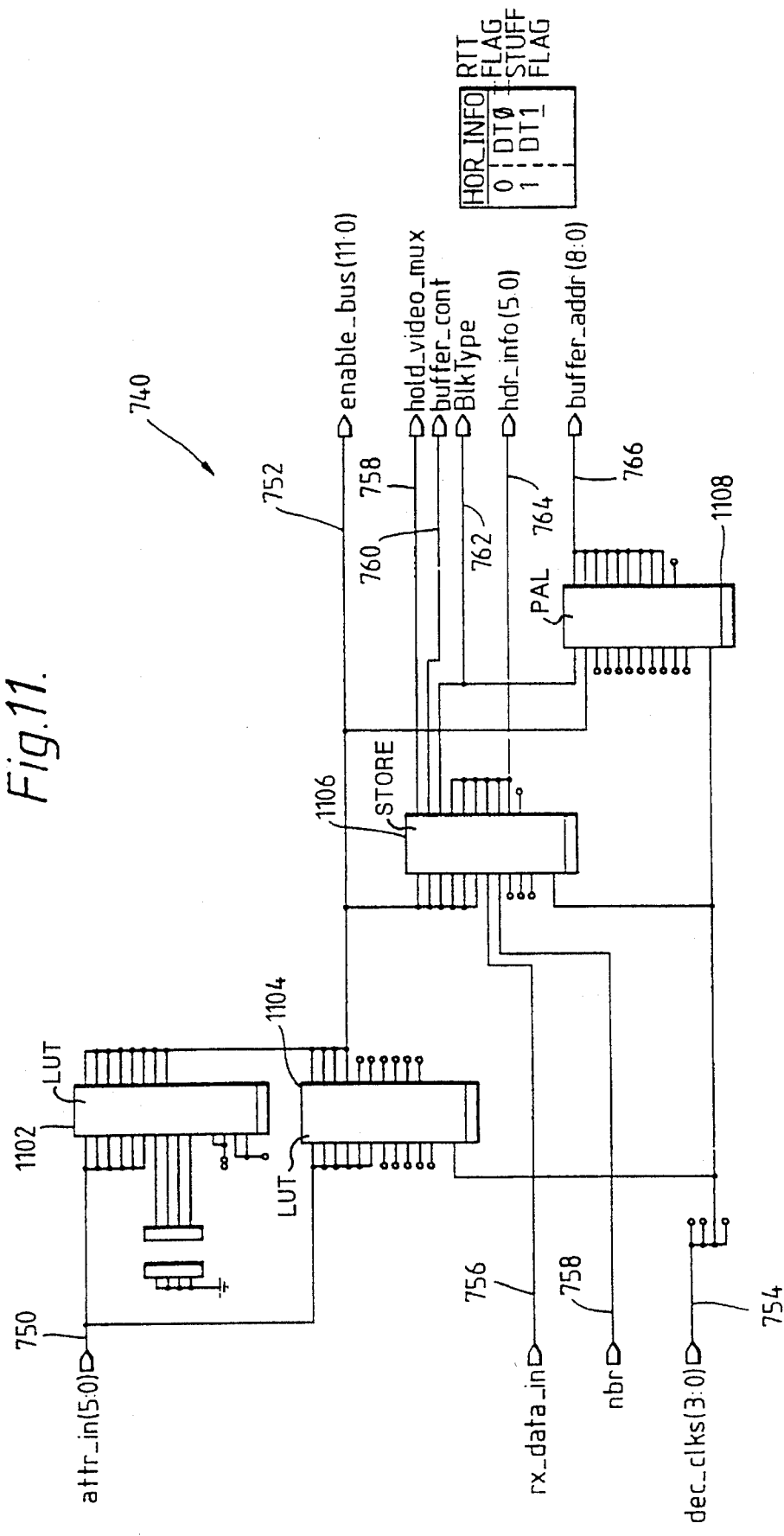
FIG. 11 is a circuit diagram of the receiver side controller of the apparatus of FIG. 7.

The receiver side controller 740 of FIG. 7 is shown in more detail at FIG. 11. A 6 bit data bus 750 indicates the nature of the information block currently being processed. Receiver attribute signals on bus 750 are decoded by means of look-up tables 1102 and 1104 to provide enable signals on an enable bus 752. A DEC-clocks signal on a bus 754 synchronises the portion of the ARQ board 700 to the DECT receiver 120 of FIG. 1.

Other inputs to the receiver side controller 740 are the received data from the last received information block on line 756 together with a next block repeat input on line 758.

An information store 1106 outputs control signals depending on the information on the enable bus 752, the received data in on line 756, the next block repeat signal on line 758 and the dec-clocks signal on line 754 to produce a hold video multiplexer signal on a line 759, a buffer control signal on a line 760 and IC increment counter on line 762 and a 6 bit header information signal on a bus 764.

A PAL generates an 9 bit buffer address on a line 766.

The two look-up tables 1102 and 1104 decode the 6 bit attribute bus and when the unique attribute corresponding to the required enable signal is decoded, the relevant enable signal is asserted. The enable signals are then used as a Latch Enable which is applied to the information store 1106 to hold the relevant data valid until the next Latch Enable.

Figure 12:
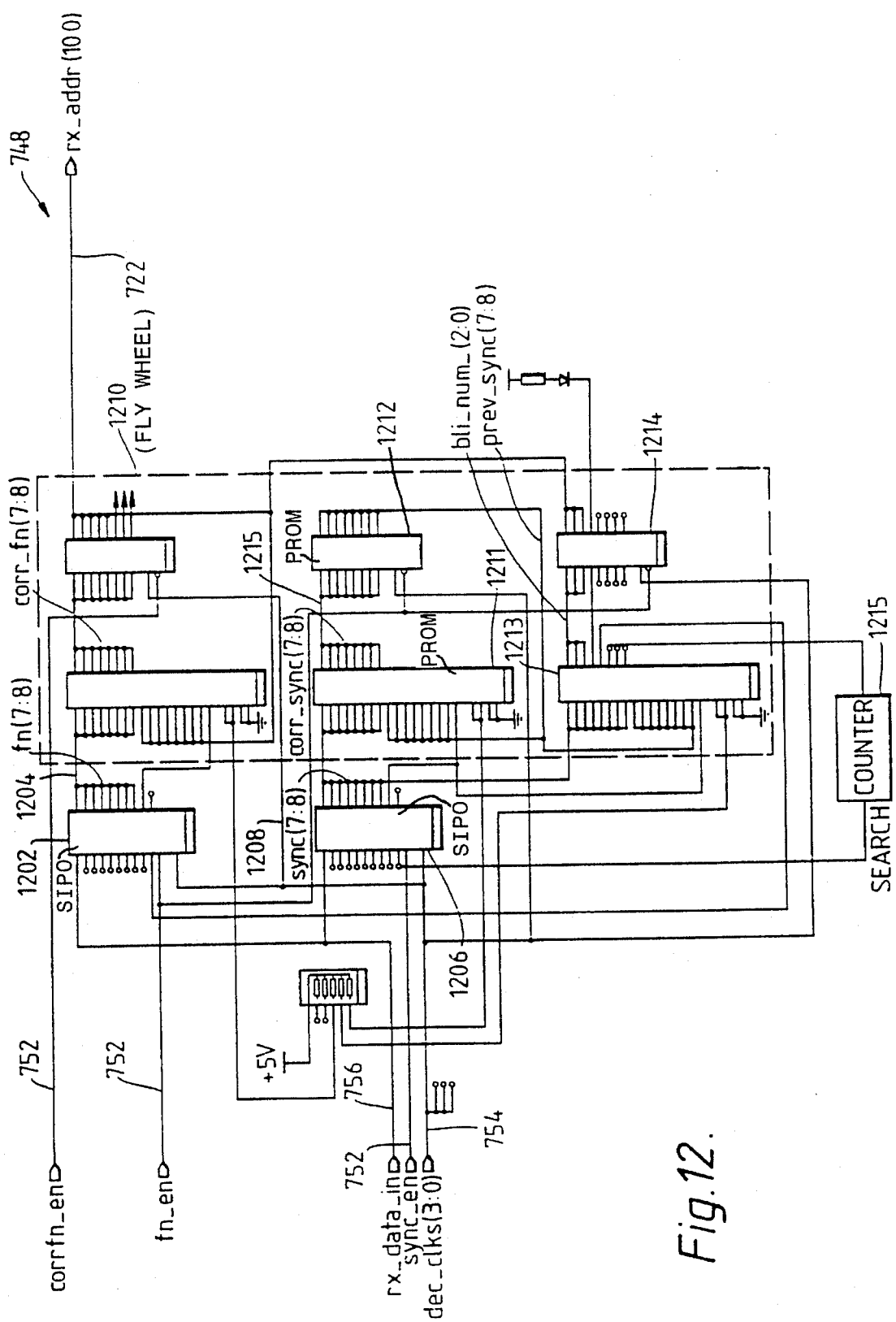
FIG. 12 is a circuit diagram of the receiver address generator of the apparatus of FIG. 7.

Referring now to FIG. 12 there is shown in more detail the receiver address generator 748 of FIG. 7 which provides synchronisation to the RSB and RFNB of the received information blocks and ties them to a flywheel arrangement. The receiver address generator 748 takes as inputs the received data in line 756, a 4 bit clock signal on bus 754 and enable signals on bus 752 from the receiver side controller 740. A SIPO 1202 outputs a frame number based on the RFNB of the received information blocks from line 756 to output a frame number on line 1204.

PROMs 1211 and 1212 compare the new synchronisation word with the latch synchronisation word and the correct value is placed on the output line 1215. If the correct value is different from the new value then an error is asserted to allow PAL 1215 to start counting up. The PAL 1215 counts on a block basis if the error signal is asserted. If the error is non-asserted the count is reset. If the count reaches a predetermined value (16 in the present case) synchronisation is assumed to be lost and the search for synchronisation is asserted. While the search is asserted, the output is always the new value. When the flywheel gets back into synchronisation the new value will be the correct value and the error signal is unasserted.

A further SIPO 1206 provides a synchronisation word on bus 1208 based on the RSBs of the incoming received information blocks.

The frame number and synchronisation sequence on buses 1204 and 1208 respectively are input to a flywheel circuit indicated within the dotted box as 1210 to produce a robust receive address output on the line 722.

Figure 13:
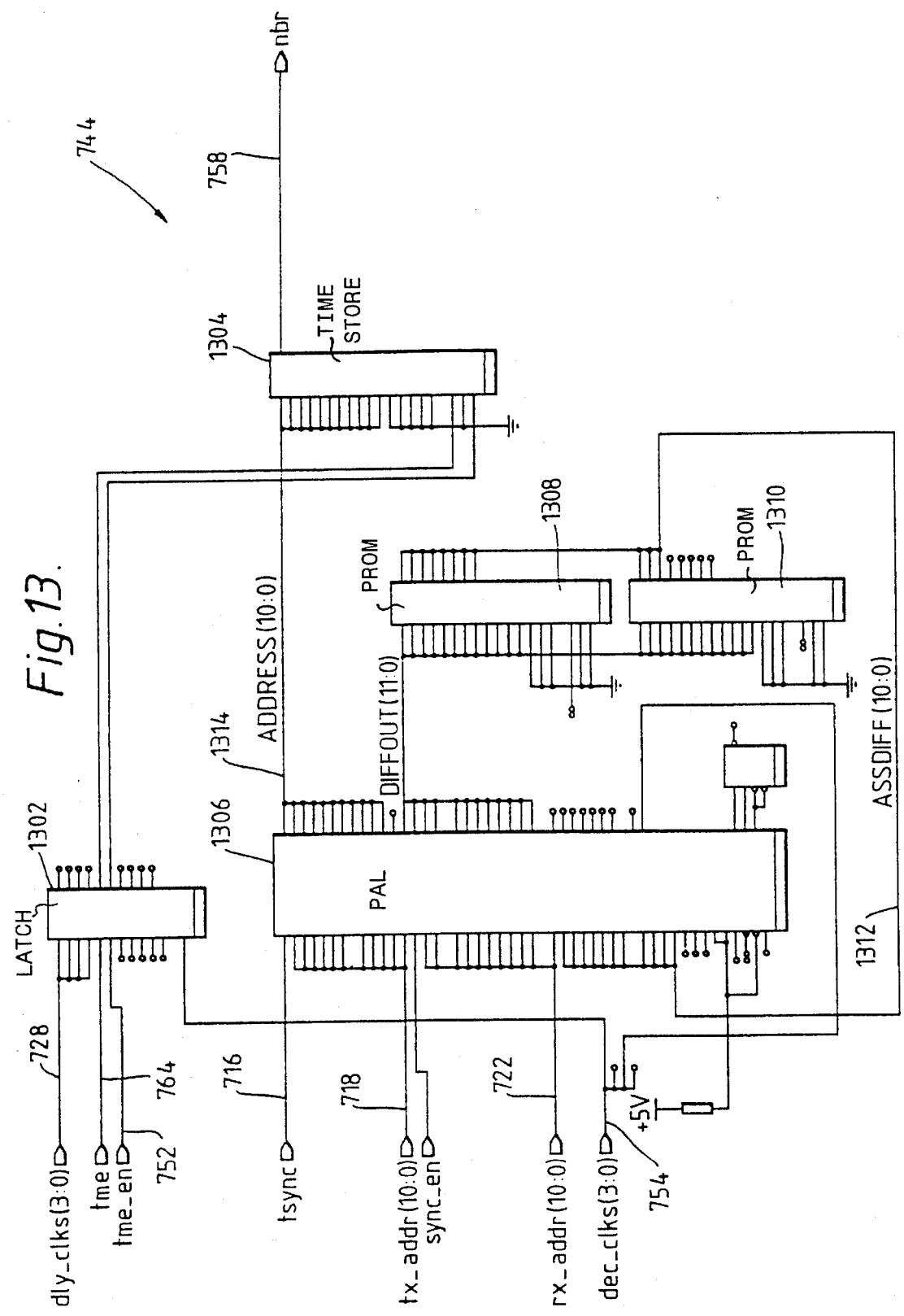
FIG. 13 is a circuit diagram of the path delay calculator of the apparatus of FIG. 7.

Referring now to FIG. 13 there is shown in more detail the path delay generator 744 of FIG. 7. The function of the path delay generator 744 is to provide a next block repeat signal when the next information block to be received is expected to contain a repeated data block.

The next block repeat signal is output on the line 758 and passed to the receiver side con, roller 740 as described with reference to FIG. 11. A Too Many Errors (TME) signal is input to the path delay generator from bus 764 together with a TME enable signal from the enables bus 752. The TME and TME enable lines are input to a latch PAL 1302 together with the 3bit delay clock signal on the bus 728 generated by the transmitter store 712. The latch 1302 generates a TME signal which is stored in a TME store 1304. The store 1304 operates by storing the newly generated TME flag for the current received information block. The output from the TME store 1304 is cycled through a series of addresses equal to the total path delay of the communications system of which the apparatus is part. Thus the TME flag for the current received information block will be output from the store 1304 when the information block which should contain the repeated data clock is received at the apparatus at a later time. The addressing of the store 1304 is reset on the basis of the path delay which is determined from the transmit address of the current outgoing information block and the receive address of the currently received information block. The transmit address of the currently transmitted block is input to a programmable array 1306 on the line 718 together with the receive address of the currently received information block on the line 722 from the receive address generator 748. The difference between the addresses is calculated by the programmable array 1306 and PROMs 1308 and 1310 convert the difference to an absolute difference.

The absolute difference is a 11 bit value which is input into the programmable array 1306 via line 1312. The address for reading into and writing from the TME store 1304 is output from the programmable array 1306 on line 1314, and as stated above is reset to zero after the appropriate delay.

Figure 14:
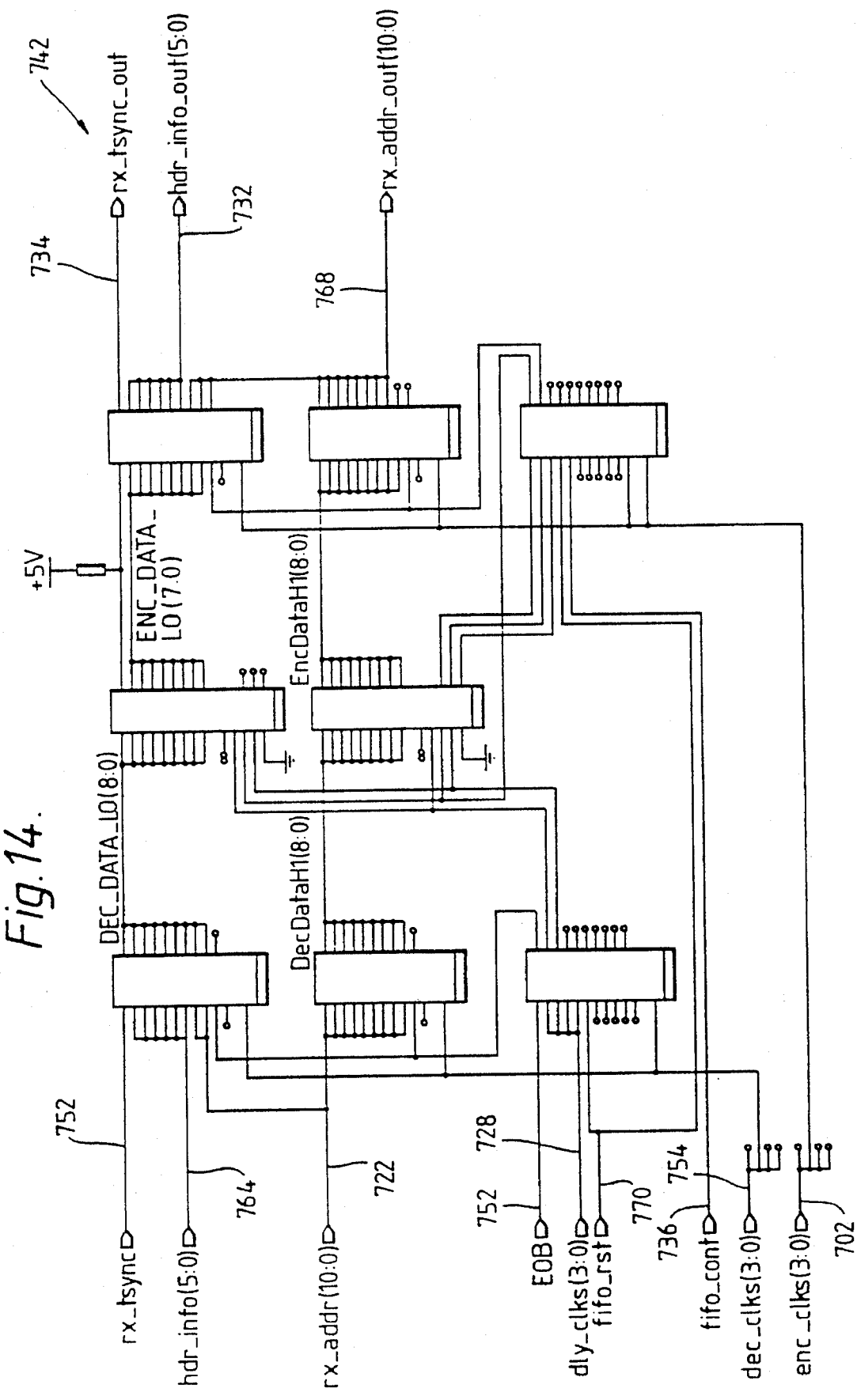
FIG. 14 is a circuit diagram of the FIFO of the apparatus of FIG. 7.

Referring now to FIG. 14 there is shown in more detail the FIFO 742 of FIG. 7. The timing of the components of the FIFO 742 is controlled by the three clock buses, delay clock 728, decrement 752 and ENC clock 702 which co-ordinates the operation of the transmitter side of the ARQ board, which is tied to the timing of the encoder, to the timing of the receiver side of the ARQ board 700, which is tied to the DECT timing. In the present embodiment the clocks of the encoder and DECT transmitter are tied together. In general however if there is a mismatch between the timing of the two then the FIFO will provide the retiming that is necessary.

Figure 15:
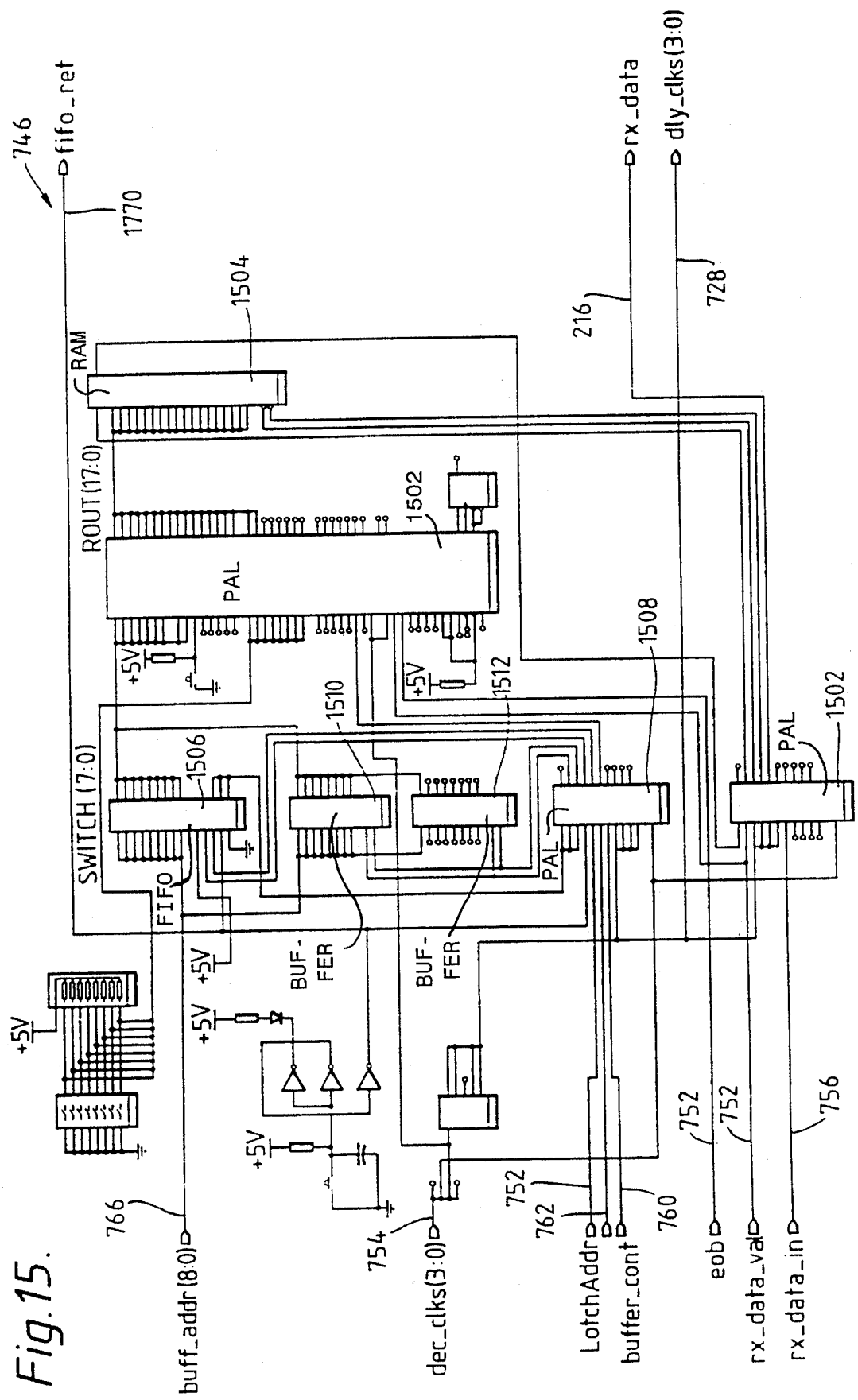
FIG. 15 is a circuit diagram of the receiver buffer calculator of the apparatus of FIG. 7.

Referring now to FIG. 15 there is shown in more detail the receiver buffer 746 of FIG. 7. The receive data for outputting to the video demultiplexer 218 of FIG. 2 is output on line 218 from a PAL 1502 from a RAM 1504. The incoming receiver data on line 756 is stored in the RAM 1504 at a buffer address provided on line 766 by the receiver side controller 740 (see FIG. 11). If the received data is not expected to be a repeated block, ie the next block repeat block signal is low then the receiver side controller 740 will provide a buffer address a which the receiver data is to be stored. However, the data is only stored if the repeat flag is not set, this is determined by the main controller. The repeat flag is analyzed by the PAL 1106 of FIG. 11. In the PAL 1106 the repeat flag is compared with the next block repeat (NBR) signal on line 748. The PAL 1106 generates an increment counter on line 762 to increment the counter generated by PAL 1108 on receipt of a non-repeat, non-stuff block. If a corrupt information block is received the PAL 1106 asserts a buffer control signal on line 760 and PAL 1508 generates the control signals to store the buffer address in the FIFO 1506.

The address is retrieved for repeater blocks by looking at the NBR flag only. The PAL 1508 checks the NBR bit and generates the appropriate control signals for the FIFO 1506 and the buffers 1510 1512. The repeat flag is only used to detect return path errors, ie spuriously repeated blocks and unrepeated blocks when a repeated block was expected.

The three acknowledge bits of the last three consecutive information blocks received at the apparatus are stored in a PAL (not shown). Signals on the enable bus generated by PALs 1102 and 1104 provide the enable signals so that the latched ACK signals are fed to the main controller PROM 1602 for comparison. If any of the three acknowledge bits for a given transmitted information block are not set then the ARQ board retransmits the failed video data block in the next information block to be transmitted.

We claim:

1. Apparatus for receiving information blocks, each of which includes a data block, from a further apparatus in a duplex communications system, which apparatus is arranged to determine if a received information block has been corrupted and when it has, to request the further apparatus to repeat the transmission of the data block of that information block, the data blocks being stored in a receiver buffer, said apparatus comprising:

a) means to store a first receiver buffer address being the address at which the data block of the corrupted information block is to be stored if repeated in a later information block;

b) means to determine in which later information block the repeat transmission of the data block is expected to occur; and c) means which, on receiving the later information block uncorrupted, stores the data block in the receiver buffer at the first receiver buffer address.

2. Apparatus as in claim 1 in which each information block includes a Repeat Flag which when set indicates that the information block contains a repeated data block.

3. Apparatus as in claim 2 in which the data block of the later information block is stored in the receiver buffer at the first receiver buffer address only if the Repeat Flag of the later information block is set.

4. Apparatus as in claim 1 in which the data block of a corrupted information block, which has not previously been determined to be one expected to include a repeat transmission of a data block, is stored in the receiver buffer and when an uncorrupted repeated information block is received, the data block stored in the receiver buffer is overwritten.

5. Apparatus as in claim 1 which is further arranged to transmit information blocks having header data by which the apparatus can associate a transmission address with each information block.

6. Apparatus as in claim 5 which is further arranged to transmit information blocks having header data by which a like apparatus can associate a receiver address with each information block.

7. Apparatus as in claim 6 in which the receiver address in the information block corresponds to the transmission address of the information block last received by the apparatus.

8. Apparatus as in claim 7 in which the determination of the later information block in which the repeated transmission of a data block is expected to occur is determined from the transmission address of the information block last transmitted and the receiver address of the information block last received by the apparatus.

9. Apparatus as in claim 5 in which n consecutive information blocks are transmitted as a frame of information blocks, the header data of the information blocks including a Transmitted Synchronisation Bit (TSB), a Transmitted Frame Number Bit (TFNB), the TSBs and TFNBs of the n consecutive information blocks of a frame forming an n-bit synchronisation sequence and an n-bit frame number, respectively.

10. Apparatus as in claim 9 in which the header data of the information blocks further includes a Received Synchronisation Bit (RSB) and a Received Frame Number Bit (RFNS), the RSBs and RFNBs of the n consecutive information blocks of a frame forming an n-bit synchronisation sequence and an n-bit frame number, respectively.

11. Apparatus as in claim 10 in which each RSB and RFNB is the complement of the TSB and TFNB of the information block last received.

12. Apparatus as in claim 9 in which n=8.

13. Apparatus as in claim 11 in which the header data of each information block includes an acknowledge bit which indicates whether the last received information block was corrupted and n further acknowledge bits, n greater or equal to 1, each of which indicates whether a distinct earlier received information block was corrupted, or the acknowledge bits being associated with n+1 consecutive information blocks.

14. Apparatus as in claim 13 in which a data block is retransmitted if any acknowledge bit indicates an information block was received corrupted by the further apparatus.

15. Apparatus as in claim 13 in which n=2.

16. Apparatus as in claim 1 in which the data blocks comprise compressed video data.

17. Apparatus as in claim 16 in which the compressed video data is obtained from an H.261 video coder.

18. Apparatus as in claim 1 which is arranged to transmit and receive information blocks via a radio link.

19. Apparatus as in claim 18 in which the apparatus is arranged to transmit and receive information blocks to the DECT radio link standard.

20. A method for receiving information blocks, each of which include a data block, and for determining if a received information block has been corrupted and when it has, to request repeated transmission of the data block of that information block, the data blocks being stored in a receiver buffer said method comprising:

a) storing a first receiver buffer address being the address at which the data block of the corrupted information block is to be stored if repeated in a later information block;

b) determining at the receiver in which later information block the repeat transmission of the data block is expected to occur; and c) upon receiving the later information block uncorrupted, storing the data block in the receiver buffer at the first receiver buffer address.

21. Method as in claim 20 in which each information block includes a Repeat Flag which when set indicates that the information block contains a repeated data block.

22. Method as in claim 21 in which the data block of the later information block is stored in the receiver buffer at the first receiver buffer address only if the Repeat Flag of the later information block is set.

23. Method as in claim 20 in which the data block of a corrupted information block, which has not previously been determined to be one expected to include a repeat transmission of a data block, is stored in the receiver buffer and when an uncorrupted repeated information block is received, the data block stored in the receiver buffer is overwritten.

24. Method as in claim 20 including the step of transmitting information blocks having header data by which the apparatus can associate a transmission address with each information block.

25. Method as in claim 24 further including transmitting information blocks having header data by which a like apparatus can associate a receiver address with each information block.

26. Method as in claim 25 in which the receiver address in the information block corresponds to the transmission address of the information block last received by the apparatus.

27. Method as in claim 26 in which the determination of the later information block in which the repeated transmission of a data block is expected to occur is determined from the transmission address of the information block last transmitted and the receiver address of the information block last received by the apparatus.

28. Method as in claim 24 in which n consecutive information blocks are transmitted as a frame of information blocks, the header data of the information blocks including a Transmitted Synchronisation Bit (TSB), a Transmitted Frame Number Bit (TFNB), the TSBs and TFNBs of the n consecutive information blocks of a frame forming an n-bit synchronisation sequence and an n-bit frame number, respectively.

29. Method as in claim 28 in which the header data of the information blocks further includes a Received Synchronisation Bit (RSB) and a Received Frame Number Bit (RFNS), the RSBs and RFNBs of the n consecutive information blocks of a frame forming an n-bit synchronisation sequence and an n-bit frame number, respectively.

30. Method as in claim 29 in which each RSB and RFNB is the complement of the TSB and TFNB of the information block last received.

31. Method as in claim 28 in which n=8.

32. Method as in claim 30 in which the header data of each information block includes an acknowledge bit which indicates whether the last received information block was corrupted and n further acknowledge bits, n greater or equal to 1, each of which indicates whether a distinct earlier received information block was corrupted, or the acknowledge bits being associated with n+1 consecutive information blocks.

33. Method as in claim 32 in which a data block is retransmitted if any acknowledge bit indicates an information block was received corrupted by the further apparatus.

34. Method as in claim 32 in which n=2.

35. Method as in claim 20 in which the data blocks comprise compressed video data.

36. Method as in claim 35 in which the compressed video data is obtained from an H.261 video coder.

37. Method as in claim 20 including transmitting and receiving information blocks via a radio link.

38. Method as in claim 37 including transmitting and receiving information blocks to the DECT radio link standard.

* * * * *